(12) United States Patent
Nakanishi (10) Patent No.: US 8,557,475 B2
(45) Date of Patent: Oct. 15, 2013

(54) AIR BATTERY MODULE

(75) Inventor: Shinji Nakanishi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/677,695

(22) PCT Filed: May 8, 2009

(86) PCT No.: PCT/JP2009/058666
§ 371 (c)(1),
(2), (4) Date: May 6, 2010

(87) PCT Pub. No.: WO2010/128552
PCT Pub. Date: Nov. 11, 2010

(65) Prior Publication Data
US 2012/0115068 A1    May 10, 2012

(51) Int. Cl.
*H01M 8/22* (2006.01)
(52) U.S. Cl.
USPC .......................................... 429/498; 429/405
(58) Field of Classification Search
USPC ...................... 429/50, 53, 498, 416, 165, 519
See application file for complete search history.

(56) References Cited

U.S. PATENT DOCUMENTS

| 3,658,591 A * | 4/1972 | Fukuda et al. ................ 429/59 |
| 5,011,747 A | 4/1991 | Strong et al. |
| 6,368,738 B1 * | 4/2002 | Passaniti et al. ............. 429/405 |
| 2010/0190043 A1 * | 7/2010 | Nakanishi ...................... 429/50 |

FOREIGN PATENT DOCUMENTS

| CN | 1288268 A | 3/2001 |
| JP | 05258781 A | 8/1993 |
| JP | 3051455 | 3/2000 |
| JP | 2008-181853 A | 8/2008 |
| JP | 2009-32399 A | 2/2009 |
| WO | WO 2008/136296 A1 | 11/2008 |
| WO | 2009/013629 A2 | 1/2009 |

* cited by examiner

*Primary Examiner* — Mark F Huff
*Assistant Examiner* — Monique Wills
(74) *Attorney, Agent, or Firm* — Kenyon & Kenyon LLP (57) ABSTRACT

The present invention provides an air battery module comprising: a housing; a plurality of power sections incorporated in the housing; and an electrolytic solution which is filled in the housing to immerse the plurality of power sections and in which oxygen is dissolved, one of the power sections and another of the power sections sharing the electrolytic solution. The air battery module is capable of attaining downsizing and of obtaining high output.

17 Claims, 5 Drawing Sheets

AIR BATTERY MODULE

This is a 371 national phase application of PCT/JP2009/058666 filed 8 May 2009, the contents of which are incorporated herein by reference.

TECHNICAL FIELD

The present invention relates to an air battery module.

BACKGROUND ART

An air battery is a battery employing oxygen as a cathode active material; at the time of discharge, air is introduced from outside the battery. So, compared with other type of batteries which incorporate active materials for both cathode and anode, it is possible to enlarge the occupancy rate of the anode active material in the battery case. Hence, in principle, the air battery has features that dischargeable electric power is large as well as downsizing and weight saving can be easily carried out. In addition, oxidation power of oxygen to be employed as the cathode active material is strong so that the electromotive force is relatively high. Moreover, since oxygen is a clean resource the amount of which is not limited, the air battery is environmentally-friendly. As above, air battery has many advantages; therefore it is expected to be used for batteries for mobile devices, electric vehicles, hybrid cars, and fuel-cell-powered vehicle.

An embodiment of an air battery, for example, comprises: a housing; and a power section being incorporated in the housing, wherein the power section comprises, in the order mentioned: a cathode, an electrolyte layer including an electrolytic solution, and an anode. In this case, by ion conduction between the cathode and the anode through the electrolyte layer (electrolytic solution) of the power section, it is possible to take out the electric energy to outside the battery.

In the above embodiment employing an electrolytic solution in the electrolyte layer, problems such as depletion of the electrolytic solution and gas retention in the battery are caused due to, for example, volatilization of electrolytic solution as well as degradation of electrode material and electrolytic solution by the discharge. To solve the above problems, for instance, Patent literature 1 proposes an air battery where the air electrode and the anode are always filled with electrolytic solution by impregnating an entire power section with an electrolytic solution.

CITATION LIST

Patent Literature

Patent Literature 1: Japanese Patent Application Laid-Open (JP-A) No. 2008-181853

SUMMARY OF THE INVENTION

Technical Problems

Presumably, even if volume change of the electrodes occurs in relation to the charge-discharge of the battery, the air battery of Patent literature 1 can inhibit depletion of the electrolytic solution and maintain battery performance by always filling the air electrode and the anode with an electrolytic solution. However, when the battery is used for vehicles and high output power source, it is necessary to connect many air batteries; whereby the air battery module becomes larger, which is problematic. Thus, about the conventional air battery modules, improvement of compatibility between high output and downsizing of the air battery module has been required.

Accordingly, an object of the present invention is to provide an air battery module which is capable of attaining downsizing and of obtaining high output.

Solution to Problem

To solve the above problems, the invention has the following structure. As it were, the present invention is an air battery module comprising: a housing; a plurality of power sections incorporated in the housing; and an electrolytic solution which is filled in the housing to immerse the plurality of power sections and in which oxygen is dissolved, one of the power sections and another of the power sections sharing the electrolytic solution.

In the invention, each of the plurality of power sections preferably comprises: an anode; a cathode(s) being disposed outside of the anode and facing the electrolytic solution; and an electrolyte layer(s) disposed between the anode and the cathode. By providing the cathode outside of the power section, one of the power sections and another of the power section can adequately share the electrolytic solution; thereby dissolved oxygen can be efficiently introduced from the electrolytic solution. Hence, the air battery module is capable of attaining downsizing and of obtaining high output.

In the above invention where the cathode is arranged outside of the power section, each of the plurality of the power sections is preferably formed in a columnar shape. The term "columnar shape" is not particularly limited as long as it has a structure where the anode, the electrolyte layer, and the cathode have a predetermined cross-section and be extended along the longitudinal direction, wherein the anode is arranged at the inner side, the cathode is arranged at the outer side, and the electrolyte layer is arranged between the anode and the cathode. Examples thereof include: prism, circular cylindrical shape, oval cylindrical shape, and hollow cylindrical shape.

Particularly, in the invention, each of the plurality of the power sections is preferably formed in a cylindrical shape. In the invention, the term "cylindrical shape" means a concept including wire and fiber. In the cell reaction over the entire air battery, cell reaction at the cathode (cell reaction occurred by introducing oxygen into the cathode) is assumed to be rate-controlling. Therefore, by providing a cylindrical power section and providing the cathode in the outer side (side surface) of the cylinder, it is possible to make the contact area of cathode with the electrolytic solution larger than that of anode with the solid electrolyte. Accordingly, it becomes possible to efficiently carry out the rate-controlling cathode cell reaction; whereby an air battery module of higher output can be obtained.

In addition, in the above invention where the power section is formed in a cylindrical manner, a side surface of one of the cylindrical power sections and a side surface of another of the power sections are preferably in contact with each other. In the side surface of each cylinder, a cathode is formed; these cathodes do not cause any problems in cell reaction when contacting with each other but can efficiently collect current at the cathode. Moreover, by the mode having the power sections being in contact with each other, it is possible to obtain a much smaller air battery module.

Particularly, in the above invention where the power section is formed in a cylindrical manner, the plurality of cylindrical power sections are preferably arranged in a close-packed manner and incorporated in the housing. By the mode, the electrolytic solution is arranged in the gap between the cylinders, which enable to adequately share the electrolytic solution and to minimize the volume of the power section. Hence, it is possible to obtain a much smaller and higher output air battery module.

Further, in the above invention where the cathode is arranged in the outer side (side surface) of the power section, the ratio of a contact area A of the side surface of the cathode with the electrolytic solution to a contact area B of the side surface of the anode with the electrolyte layer (area ratio A/B) is preferably 1.2 or more and 2.2 or less. By having the structure, current density of the cathode can be controlled; thereby overvoltage can be controlled and cathode cell reaction can be efficiently carried out even under a high output condition. Hence, it is possible to obtain a higher output and higher efficiency air battery module.

On the other hand, the invention preferably has a mode where the housing comprising a gas supply port at the lower part and a gas exhaust port at the upper part, the face which faces the electrolytic solution for the cathode preferably extends along the vertical direction of the housing. By the structure, retention of the gas generated by the cell reaction or the gas (bubbles) remaining in the electrolytic solution, and so on does not occur inside and outside of the power section, but the gas is adequately discharged from the gas exhaust port arranged at the upper part of the housing; whereby it is possible to control increase of internal resistance of the battery and possible to obtain a high output air battery module.

Moreover, in the above invention having a gas supply port at the lower part and a gas exhaust port at the upper part of the housing, wherein the array direction of the cathode, the electrolyte layer, and the anode in the power section intersects with the vertical direction of the housing, an oxygen-containing gas is preferably supplied to the electrolytic solution through the gas supply port arranged at the lower part of the housing to dissolve the oxygen in the electrolytic solution. By the structure, retention of the gas (bubbles) does not occur at the power section but oxygen is homogenously dissolved over the entire electrolytic solution; thus, particularly increase of internal resistance can be controlled and cell reaction at the cathode can be evenly and efficiently carried out. Therefore, it is capable of obtaining a high output air battery module.

Effects of the Invention

The present invention has a mode where a plurality of the power sections share an electrolytic solution in the housing, thereby the volume of the power section in the housing is lowered. In addition, since oxygen is dissolved in the electrolytic solution, by introducing the dissolved oxygen of the electrolytic solution into the cathode, it is possible to adequately carry out the cell reaction in the power section. Moreover, the invention can inhibit depletion of the electrolytic solution. Accordingly, the invention can provide an air battery module which is capable of attaining downsizing and obtaining high output.

LIST OF REFERENCE NUMERALS 100 air battery module
10 cathode
20 anode
30 electrolyte layer
40 power section
50 electrolytic solution
60 housing
70 gas supply port
80 gas (oxygen-containing gas)
90 gas exhaust port
200 air battery module
101 gas-supplying zone
102 cell-stacking zone
103 zone of excess electrolytic solution
104 gas-exhausting zone
110 cathode
120 anode
130 electrolyte layer
140 power section
160 housing

DESCRIPTION OF EMBODIMENTS OR MODE(S) FOR CARRYING OUT THE INVENTION

Hereinafter, the present invention will be described based on a case of applying to a lithium air battery module comprising: a housing; and a plurality of power sections, each of which comprises: a cathode(s), an anode, and an electrolyte layer(s) disposed between the cathode and the anode and which are incorporated in the housing. It should be noted that the present invention can also be applied to other air battery modules such as modules of zinc-air battery, aluminum-air battery, and sodium-air battery, those of which includes an electrolytic solution in the housing, wherein one of the power sections and another of the power sections share the electrolytic solution.

1. The First Embodiment

Figure 1:
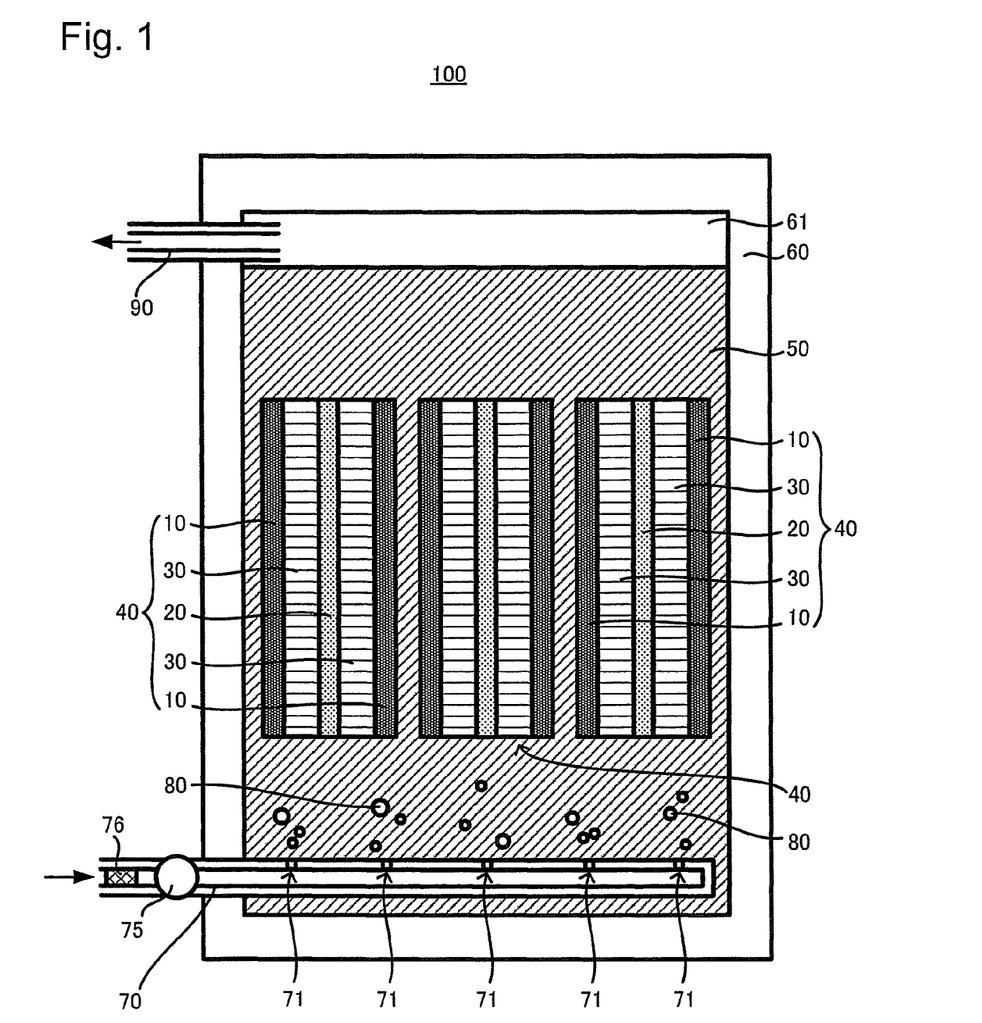
FIG. 1 is a plan schematically showing an air battery module 100.

FIG. 1 is a plan schematically showing an air battery module 100 as the first embodiment of the invention. As shown in FIG. 1, the air battery module 100 comprises: a housing 60; and a plurality of power sections 40 being incorporated in the housing 60, each of which comprises: cathodes 10, 10; an anode 20; and electrolyte layers 30, 30 arranged between the cathodes 10, 10 and the anode 20. In the housing 60, an electrolytic solution 50 is reserved to immerse each of the plurality of power sections 40, 40, . . . ; one of the power sections 40 and another of the power sections 40 share the electrolytic solution 50. Further, a space 61 is provided at the upper part of the housing 60. On the other hand, a gas supply port 70 is inserted at the lower part of the housing 60. The gas supply port 70 comprises a pump 75 and a filter 76; through the pump 75 and the filter 76, gas can be supplied to inside of the housing. In the side surface at inside the housing of the gas supply port 70, holes 71, 71, . . . are provided; by supplying (bubbling) gas 80 (oxygen-containing gas 80) to the electrolytic solution 50 through the holes, oxygen can be dissolved in the electrolytic solution 50. Moreover, at the upper part of the housing 60, a gas exhaust port 90 extending from inside to outside of the housing 60 is provided, which enables to discharge the gas from the space 61 of the housing 60 to outside of the housing. Hereinafter, the air battery module 100 will be described on the element basis.

<Cathode 10>

The cathode 10 contains a conductive material, a catalyst, and a binder for binding the conductive material and the catalyst. The cathode 10 is provided with a cathode current collector (not shown) which abut on either inside or outer surface of the cathode 10 to collect the current of the cathode 10. Each of the cathodes 10, 10 is arranged at the outermost part of the power section 40 and is in contact with the electrolytic solution 50; then, cell reaction is carried out when the cathode 10 takes the oxygen dissolved in the electrolytic solution 50.

The conductive material contained in the cathode 10 can endure the operating environment of the air battery module 100; the conductive material is not particularly limited as long as it has conductive property. Examples of the conductive material contained in the cathode 10 include carbon materials such as carbon black and mesoporous carbon. In view of inhibiting, e.g., decrease of reaction site and reduction of battery capacity, the content of the conductive material in the cathode 10 is preferably 10 mass % or more. In addition, in view of forming an embodiment which can exhibit sufficient catalytic function, the content of the conductive material in the cathode 10 is preferably 99 mass % or less.

As the catalyst contained in the cathode 10, there may be cobalt phthalocyanine and manganese dioxide. In view of forming an embodiment which can exhibit sufficient catalytic function, the content of the catalyst in the cathode 10 is preferably 1 mass % or more. Moreover, in view of inhibiting, e.g., decrease of reaction site and reduction of battery capacity, the content of the catalyst in the cathode 10 is preferably 90 mass % or less.

As a binder contained in the cathode 10 may be polyvinylidene fluoride (PVDF) and polytetrafluoroethylene (PTFE). The content of the binder in the cathode 10 is not specifically limited; it is preferably 10 mass % or less, 1 mass % or more and 5 mass % or less is more preferable.

The cathode 10 can be produced by a method, for example, by applying a coating consisting of: carbon black; a catalyst; and a binder on the surface of the cathode current collector using doctor-blade method. Other than this, it can be produced by a method of thermocompression bonding using a mixed powder containing carbon black and a catalyst.

The cathode current collector is not particularly limited as long as it is made of a material having conductive property. Examples thereof include: a foil; mesh; and grid, these of which are made either of stainless steel, nickel, aluminum, iron, titanium, or carbon.

<Anode 20>

The anode 20 contains an alkali metal which functions as an anode active material. Moreover, the anode 20 is provided with an anode current collector (not shown) which abuts on either inside or outer surface of the anode 20 to collect the current of the anode 20. The anode 20 is arranged at the innermost part of the power section 40.

Examples of elemental substance of alkali metal to be contained in the anode 20 include: lithium, sodium, and potassium. In addition, examples of alkali metal compounds to be contained in the anode 20 may be lithium alloy. When the air battery module 100 is a lithium-air secondary battery, in view of providing an air battery module 100 which easily attains high capacity, lithium is preferably contained.

The anode 20 desirably contains at least an anode active material; it may further contain a conductive material for improving conductive property and a binder for fixing the alkali metal and the like. In view of inhibiting, e.g., decrease of reaction site and reduction of battery capacity, the content of the conductive material in the anode 20 is preferably 10 mass % or less. Also, the content of the binder in the anode 20 is not specifically limited; however, for example, it is preferably 10 mass % or less, more preferably 1 mass % or more and 5 mass % or less. Kinds and dosage, and so on of the conductive material and binder both used in the anode 20 are the same as the case of the cathode 10.

The anode 20 is provided with an anode current collector which abuts on either inside or outer surface of the anode 20 to collect the current of the anode 20. The anode current collector functions as collecting current of the anode 20. In the air battery module 100, the material of the anode current collector is not particularly limited as long as it has a conductive property. Examples of the material for anode current collector include: copper, stainless steel, and nickel. The shape of the anode current collector may be foil, plate, and mesh (grid). In the air battery module 100, the anode 20 can be produced, for example, in the same manner as the cathode 10.

<Electrolyte Layer 30>

In the electrolyte layer 30, an electrolyte (liquid or solid type) functions as conducting ions (ions of alkali metal) between the cathode 10 and the anode 20. Particularly, an electrolytic solution is preferably used.

When a liquid electrolyte (electrolytic solution) is used as an electrolyte layer 30, the type of the electrolytic solution is not particularly limited as long as it has metal ion conductivity. The examples may be an aqueous electrolytic solution or a non-aqueous electrolytic solution. Kinds of the electrolytic solution to be used for the electrolyte layer 30 are preferably adequately selected depending on the kinds of conducting metal ions. For instance, in case of lithium-air battery, non-aqueous electrolytic solution is preferably used. The non-aqueous electrolytic solution contains lithium salt and organic solvent. Examples of lithium salt include: inorganic lithium salt such as $LiPF_6$, $LiBF_4$, $LiClO_4$, and $LiAsF_6$; and organic lithium salt such as $LiCF_3SO_3$, $LiN(CF_3SO_2)_2$, $LiN(C_2F_6SO_2)_2$, and $LiC(CF_3SO_2)_3$. Examples of the organic solvent include: ethylene carbonate (EC), propylene carbonate (PC), dimethyl carbonate (DMC), diethyl carbonate (DEC), ethyl methyl carbonate (EMC), butylene carbonate, γ-butyrolacton, sulfolane, acetonitrile, 1,2-dimethoxy methane, 1,3-dimethoxy propane, diethyl ether, tetrahydrofuran, 2-emthyl tetrahydrofuran, other fluorine-based solvent (such as $C_6F_{14}$, $C_7F_{16}$, $C_8F_{18}$, $C_9F_{20}$, hexafluorobenzene; and the mixture thereof. Further, in view of inhibiting ingress of water to inside of the battery, hydrophobic solvent is preferably used. It should be noted that, in view of providing an embodiment in which the dissolved oxygen can be efficiently used, the electrolytic solution is preferably a solvent which shows high oxygen solubility. The concentration of the lithium salt in a non-aqueous electrolytic solution is, for example, 0.2 mol/L or more and 3 mol/L or less. In the air battery of the present invention, as the non-aqueous electrolytic solution, for example, a low-volatility liquid such as ionic liquid can be used.

On the other hand, when using an electrolytic solution for the electrolyte layer 30, the electrolyte layer 30 is preferably a mode where the electrolytic solution is kept by a separator or a gel polymer. Examples of the separator include: a porous membrane such as polyethylene and polypropylene; and nonwoven fabric such as nonwoven resin fabric and nonwoven glass fabric. Examples of the gel polymer include: an acrylate-based polymer compound; an ether-based polymer compound such as polyethylene oxide, and a cross-linked body containing thereof; a methacrylate polymer compound such as polymethacrylate; a fluorine-based polymer compound such as polyvinylidene fluoride, as well as a copolymer of polyvinylidene fluoride and hexafluoropropylene. Type of the gel polymer may be granular; as long as the gel polymer is capable of keeping the electrolytic solution, it is not particularly limited. With respect to the production of the electrolyte layer 30, the production method is not particularly limited; an electrolyte layer 30 having a predetermined shape can be produced by impregnating an adequately formed separator or a gel polymer packed-bed with the above electrolytic solution and by keeping the electrolytic solution in the separator or the gel polymer.

<Power Section 40>

The power section 40 being provided to the air battery module 100 comprises: an anode 20 at the innermost side, electrolyte layers 30, 30 on the outer side of the anode 20; and cathodes 10, 10 on the outer side of the electrolyte layers 30, 30. As long as the cathode 10 can be in contact with the electrolytic solution 50, the mode of the power section 40 is not particularly limited. For example, the power section 40 may be a laminated body where electrolyte layers 30, 30 are laminated on both side of the substantially sheet-shape anode 20, and then, the cathodes 10, 10 are further laminated on the outer side of the electrolyte layer 30, 30. Alternatively, the power section 40 may be formed in a cylindrical shape by connecting one end and the other end of the laminated body. Moreover, the power section 40 may be a cylindrical, wire-type, or fiber-type one obtained by coating the electrolyte layer 30 on the outer surface of a cylindrical, wire-type, or fiber-type anode 20, and then further coating cathode 10 on the outer surface of the electrolyte layer 30. It should be noted that wirings and terminals (not shown) are provided to each current collector or the power section 40, which enables picking up of electric energy to the outside. The position for arranging the wiring or terminal is not particularly limited as long as the electric energy can be adequately taken out.

In the air battery module 100, the array direction (laminating direction) of the cathode 10, the electrolyte layer 30, and the anode 20 is substantially orthogonal to the vertical direction of the housing 60. In other words, the face facing to the electrolytic solution 50 of the cathode 10 is formed along the vertical direction. With this configuration, the gas 80 supplied from the below-described gas supply port 70 does not remain on the surface of the cathode 10; whereby bubbles are not produced. Even when bubbles occur inside the power section 40 during charge-discharge of the battery, for example, these bubbles can be discharged upwardly along the electrolyte layer 30. Thus, it is possible to inhibit increase of internal resistance of the air battery module 100 and possible to keep high output.

<Electrolytic Solution 50>

In the air battery module 100, the electrolytic solution 50 is reserved in the housing 60 and the plurality of power section 40, 40, . . . are immersed in the electrolytic solution 50 such that one of the power section 40 and another of the power section 40 share the electrolytic solution 50. The electrolytic solution 50 may be the same one as the electrolytic solution contained in the above electrolyte layer 30. Namely, by immersing the power section 40 in the electrolytic solution 50, the electrolytic solution 50 can be adequately provided to the separator and gel polymer of the electrolyte layer 30. Particularly, in the air battery module 100, as oxygen is dissolved in the electrolytic solution 50, the electrolytic solution 50 is preferably a fluorine-based organic solvent which shows high oxygen solubility.

<Housing 60>

The housing 60 is provided with at least power sections 40, 40, . . . , and the electrolytic solution 50, wherein, at the upper part of the housing 60, the space 61 is provided. In terms of the air battery module 100, the shape of the housing 60 is not specifically restricted. As the material for forming the housing 60, materials which can be used for housing of the air battery in view of stability to the electrolytic solution 50 may be appropriately used. Moreover, the space 61 provided in the housing 60 is allowed to the level where the power sections 40, 40, . . . are not exposed in the space 61. As it were, in the housing 60, the power sections 40, 40, . . . are completely immersed in the electrolytic solution 50. In the side surface at the lower part of the housing 60, a joint (for example, a through hole) which enables to joint the below-described gas supply port 70 is provided. On the other hand, in the side surface at the upper part of the housing 60, a joint (for example, a through hole) which enables to joint the below-described gas exhaust port 90 is provided.

<Gas Supply Port 70>

The gas supply port 70 is a pipe which is connected to the lower part of the housing 60 and which enables to supply gas 80 from the outside to the electrolytic solution 50 located inside the housing 60. The gas 80 to be passed through the gas supply port 70 is an oxygen-containing gas; there may be air or an oxygen gas having a pressure of $1.01 \times 10^5$ Pa and an oxygen level of 99.99%. In the gas supply port 70 at the side outside the housing 60, a pump 75 is provided, which enables to introduce the gas 80 from outside of the housing 60. Moreover, the filter 76 is provided, which enables to trap moisture and unnecessary gas (e.g. carbon dioxide) to inhibit ingress of moisture into the module. On the other hand, in the side surface at the side inside the housing of the gas supply port 70, holes 71, 71, . . . are provided. The gas 80 is bubbled from the holes 71, 71, . . . and the oxygen is dissolved in the electrolytic solution 50. The remaining gas (bubble), which has not been dissolved by the bubbling, moves toward the upper part of the electrolytic solution 50 and reach the space 61; then, it is discharged through the below-described gas exhaust port 90. The shape of the gas supply port 70 is not specifically limited. As the material for forming the gas supply port 70, materials which can be used for the air battery in view of stability to the electrolytic solution 50 may be appropriately used. For example, the material may be the same as that of the above-described housing 60.

<Gas Exhaust Port 90>

The gas 80 which has not been supplied to the cell reaction but reaches the space 61 is discharged from the inside to the outside of the housing 60 through the gas exhaust port 90 jointed at the upper part of the housing 60. The shape of the gas exhaust port 90 is not particularly limited. Moreover, as the material of the gas exhaust port 90, materials which can be used for the air battery in view of stability to the electrolytic solution 50 may be appropriately used. For example, the material may be the same as that of the above-described housing 60.

As seen above, with respect to the air battery module 100, the plurality of power sections 40, 40, . . . share the electrolytic solution 50 in the housing 60; thereby the volume of the power sections in the housing 60 is minimized. In addition, as oxygen is dissolved in the electrolytic solution 50, by taking the dissolved oxygen of the electrolytic solution 50 into the cathode 10, it is possible to adequately carry out cell reaction in the power sections 40. Moreover, by reserving a sufficient amount of the electrolytic solution 50 in the housing 60 and immersing the power sections 40, 40, . . . in the electrolytic solution 50, it is also possible to inhibit depletion of the electrolytic solution. Accordingly, the invention can provide an air battery module 100 which is capable of attaining downsizing as well as obtaining high output.

2. The Second Embodiment

Figure 2:
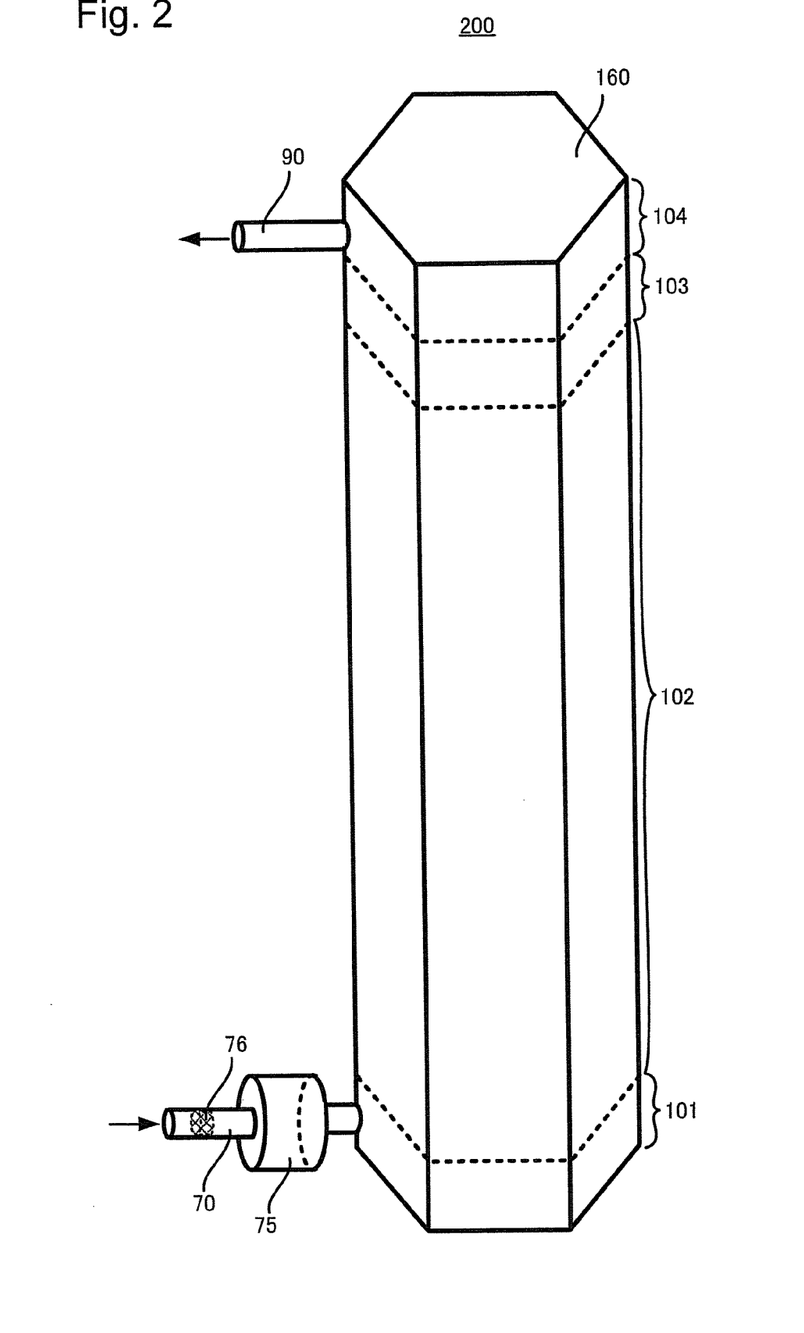
FIG. 2 is a plan schematically showing appearance of the air battery module 200.
Figure 3:
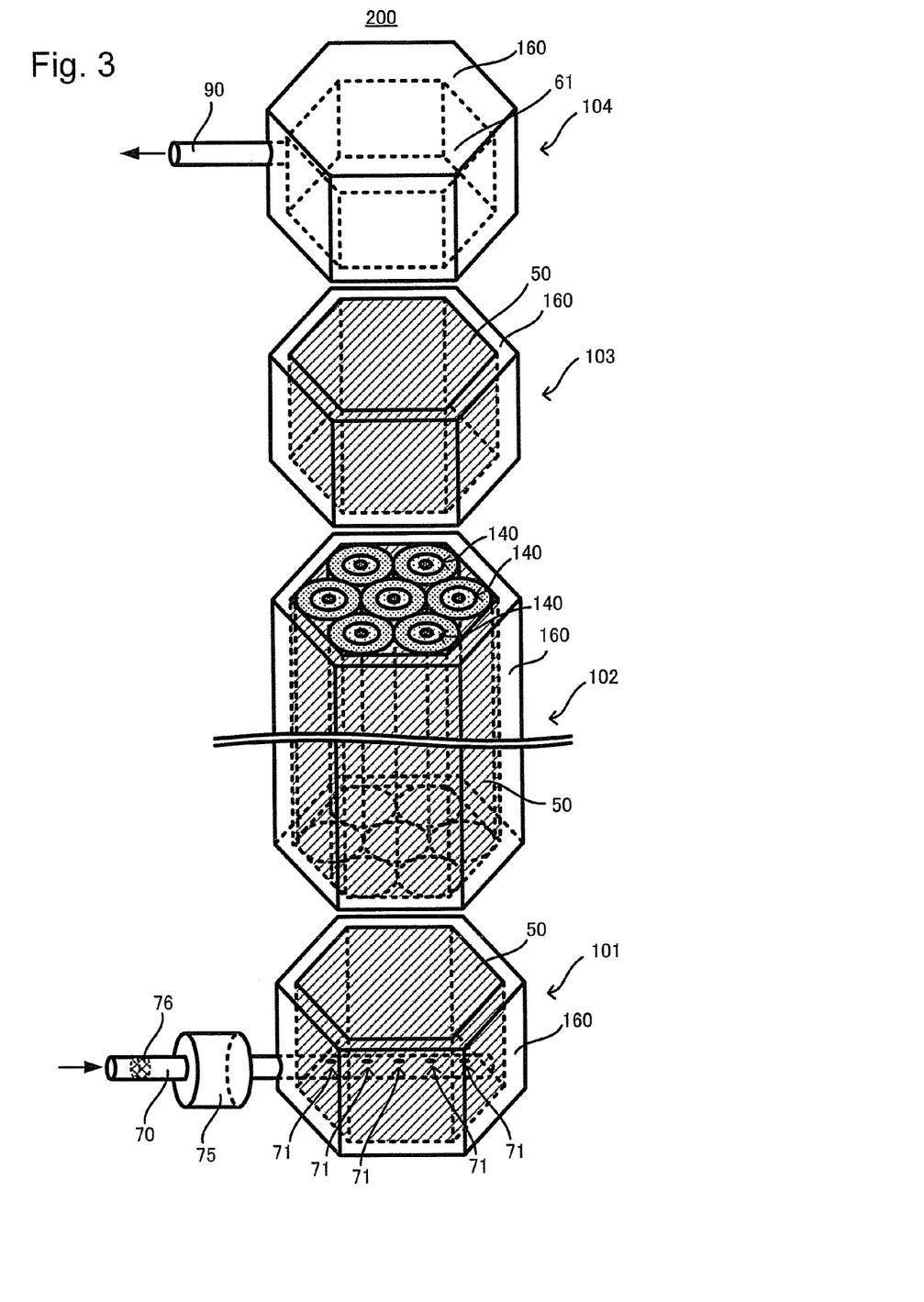
FIG. 3 is an exploded view schematically showing the air battery module 200.

FIG. 2 is a plan schematically showing the appearance of the air battery module 200; and FIG. 3 is an exploded view schematically showing the internal structure of the air battery module 200. In FIGS. 2 and 3, to the elements having the same structure as those in the air battery module 100, the same reference numerals as those used in FIG. 1 are given and the explanation thereof is omitted. The air battery module 200 comprises: a substantially hexagonal column housing 160 of which cross-section is substantially regular hexagon; and battery components such as an electrolytic solution 50 and power sections 140, 140, . . . , wherein these battery components are incorporated in the housing 160. The air battery module 200 further comprises: a gas-supplying zone 101; a cell-stacking zone 102; a zone of excess electrolytic solution 103; and a gas-exhausting zone 104. Other than the limitation where the shape of the housing 160 is determined to be a container having an appearance of substantially hexagonal column, the housing 160 has basically the same elements (e.g., materials) as those of the housing 60. The air battery module 100 will be described on the element basis, as follows.

<Gas-Supplying Zone 101>

The gas-supplying zone 101 is a part which locates at the lowermost part of the air battery module 200. The inside of the gas-supplying zone 101 is filled with the electrolytic solution 50 and a gas supply port 70 is inserted from the outside into the inside of the gas-supplying zone 101. The structure of the electrolytic solution 50 and the gas supply port 70 can be the same as those of the above-described air battery module 100. In the gas-supplying zone 101, when operating a pump 75 and supplying (bubbling) oxygen-containing gas to the electrolytic solution 50 through a filter 76, a gas supply port 70, and holes 71, 71, . . . , oxygen is dissolved in the electrolytic solution 50. The dissolved oxygen of the electrolytic solution 50 is taken in the cathode 110 of each power section 140 in the below-described cell-stacking zone 102 to supply the oxygen itself into the cell reaction.

<Cell-Stacking Zone 102>

The cell-stacking zone 102 is a part which locates on the top of the gas-supplying zone 101. The cell-stacking zone 102 incorporates a plurality of power sections 140, 140, . . . and be filled with the electrolytic solution 50 to immerse the respective power sections 140, 140, . . . in the electrolytic solution 50. Hereinafter, the structure of the power section 140 will be described.

<Power Section 140>

Figure 4A:
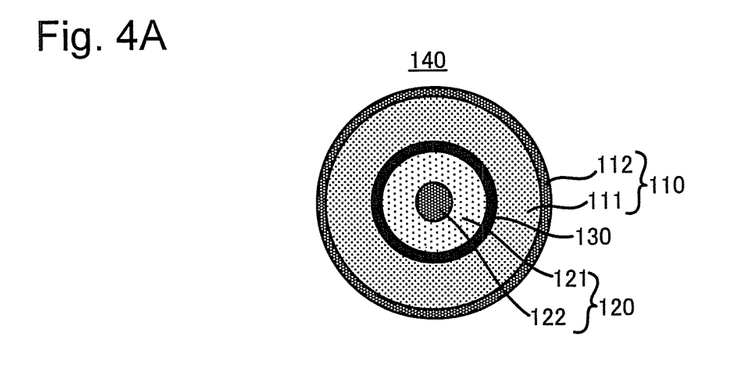
FIGS. 4A, 4B, and 4C are plans schematically showing the structure of the power section 140.
Figure 4B:
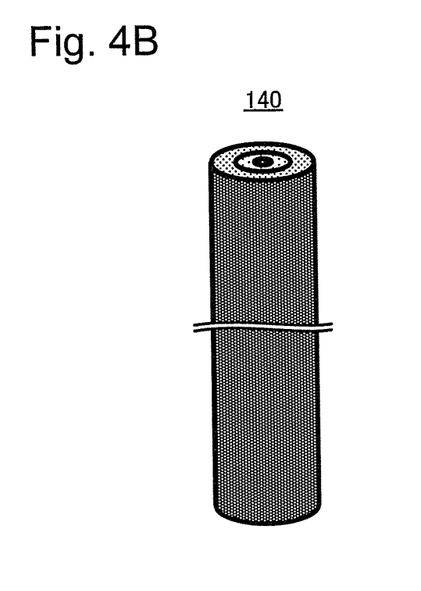
Figure 4C:
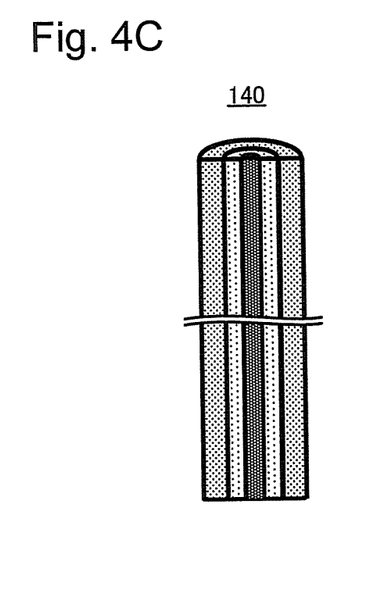

FIGS. 4A, 4B, and 4C are plans schematically showing the structure of the power section 140. As shown in FIG. 3 and FIG. 4B, the power sections 140 are formed in a substantially-cylindrical (including wire) manner. Moreover, as shown in FIG. 4A, the power section 140 comprises, from the center of the cylinder: an anode 120 including an anode current collector 122 and an anode layer 121 formed outside of the anode current collector 122; the electrolyte layer 130 formed outside of the anode 120; and a cathode 110 including a cathode layer 111 formed outside of the electrolyte layer 130 and a cathode current collector 112 formed outside of the cathode layer 111, wherein these elements inside the cylinder respectively extend in the longitudinal direction of the cylinder (see FIG. 4C.). The materials for the cathode 110, the anode 120, and the electrolyte layer 130 can be the same as those of the cathode 10, the anode 20, and the electrolyte layer 30 of the air battery module 100.

With regard to the cell reaction (for example, discharge reaction) in the power section 140, a cell reaction at the cathode 110 performed by introducing therein oxygen being dissolved in the electrolytic solution 50 becomes rate-controlling. Therefore, it is preferable to make the contact area (A) of the cathode 110 with the electrolytic solution 50 larger and to make the contact area (B) of the anode 120 with the electrolyte layer 130 smaller. Specifically, the area ratio of the contact area (A) to the contact area (B): (A/B) is preferable 1.2 to 2.2. By having the structure, current density of the cathode 110 can be lowered; thereby overvoltage can be controlled and charge-discharge can become smoother even under high-output operation.

The power section 140 is produced as follows. Namely, first of all, a cylindrical-type or a wire-type anode current collector 122 is provided. For instance, a copper wire may be used. To the exterior of the anode current collector 122, an anode material comprising: an anode active material, a conductive material, and a binder, is coated. The coating method includes, but not particularly limited to, a known method such as spray coating and dip coating. By coating an anode material, an anode layer 121 is formed outside of the anode current collector 122 to form an anode 120. Next, a sheet-type separator is wound and fixed around the surface of the anode 120, or a slurry containing a gel polymer is applied over the surface of the anode 120 and dried, to form a part as the electrolyte layer 130. When the electrolytic solution 50 is filled therein, the electrolyte layer 130 is completed. Thereafter, on the surface part of the electrolyte layer 130, a cathode material comprising a conductive material and binder is coated. The coating method may be the same as that of the anode layer 121. By coating a cathode material, a cathode layer 111 is formed outside of electrolyte layer 130. Further, on the exterior of the cathode layer 111, the cathode current collector 112 is wound and fixed. As the cathode current collector 112, for example, nickel mesh may be used. Accordingly, the cathode current collector 112 is formed on the surface of the cathode layer 111 and the cathode 110 is finally formed. The coating amount of the cathode material and anode material are adequately adjusted in consideration of the above contact areas (A) and (B).

In the cell-stacking zone 102, a plurality of power sections 140, 140, are bundled and arranged in a manner held by the wall surfaces of the housing 160. The arrangement of the power sections 140, 140, will be described with reference to FIG. 5.

Figure 5:
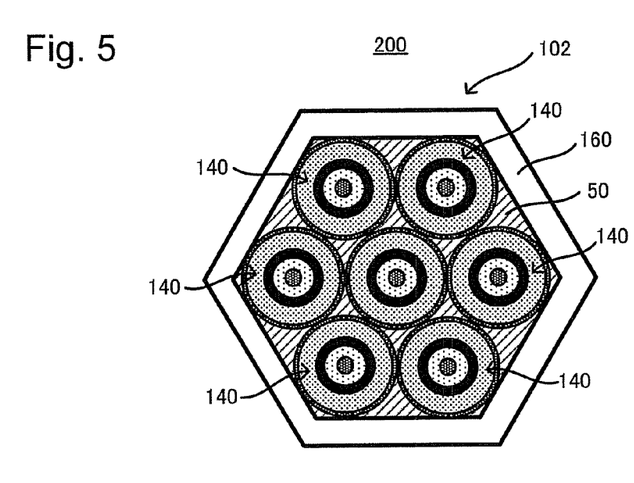
FIG. 5 is a plan schematically showing arrangement of the power section 140 in the air battery module 200.

FIG. 5 is a top view showing the cell-stacking zone 102 as seen from the top of FIG. 3. As seen from FIG. 5, the plurality of power sections 140, 140, . . . are bundled and arranged in a manner held by the wall surfaces of the substantially-regular hexagonal column housing 160. To be arranged in a close-packed manner, the power sections 140, 140, . . . are arranged such that the side surfaces of the power sections 140, 140, . . . are in contact with each other. As above, since the power section 140 is formed in a cylindrical shape (or in a wire shape), contact between the power sections 140, 140, . . . becomes substantially linear contact. So, even if the plurality of power sections 140, 140, . . . are arranged in a close-packed manner, adequate size of gaps are made between the power sections 140, 140, . . . as well as between the power section 140 and the wall surface of the housing 160. Therefore, when filling the gap portion with the electrolytic solution 50, the oxygen dissolved in the electrolytic solution 50 can be suitably taken in the cathode 110 of the power section 140; whereby depletion of the electrolytic solution 50 can be inhibited. Further, by arranging the power sections 140 in a close-packed manner, the volume of the cell-stacking zone 102 can be minimized so that it is possible to attain downsizing of the air battery module 200 while maintaining its high output.

In addition, in the cell-stacking zone 102, the array direction (laminating direction) of the cathode 110, the electrolyte layer 130, and the anode 120 is orthogonal to the vertical direction of the housing 160. In other words, the face of the cathode 110 facing the electrolytic solution 50 is formed along the vertical direction. By the structure, oxygen-containing gas supplied from the gas supply port 70 does not stay on the surface of the cathode 110 and does not form bubbles, either. Moreover, even when the gas (bubble) occurs inside the power section 140 during charge-discharge of the battery, for example, the gas can be discharged upwardly along the electrolyte layer 130. Hence, it is possible to inhibit increase of the internal resistance of the air battery module 200 and possible to maintain its high output.

The means to holding the plurality of the power sections 140, 140, . . . in the housing 160 is not particularly limited. As seen from FIG. 3, it may be a means to hold by the inner wall surfaces of the housing 160; alternatively, for example, a supporting member may be provided in the housing 160 to support the power sections 140, 140, . . . from the bottom.

Figure 6:
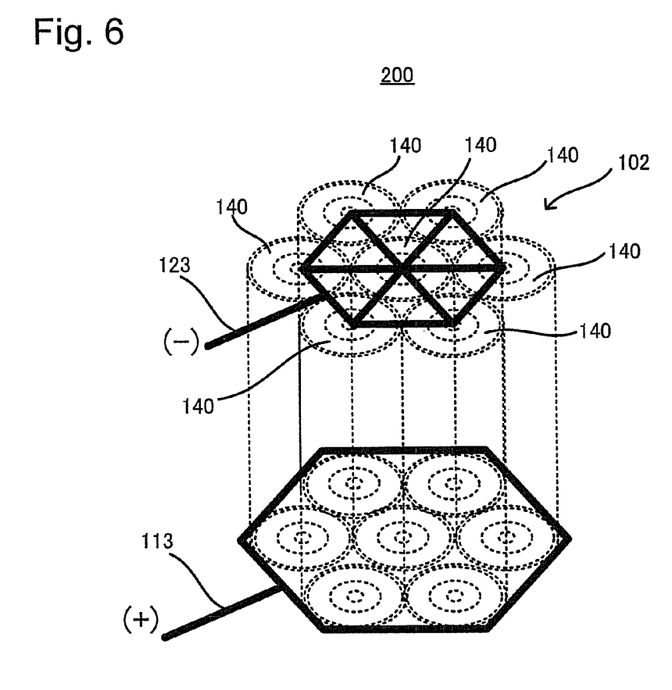
FIG. 6 is a plan illustrating a method for collecting current in the air battery module 200.

Below, a case to take out an electric energy from each of the power sections 140, 140, . . . of the cell-stacking zone 102 will be described. FIG. 6 is a plan schematically showing a mode for collecting current of the plurality of power sections 140, 140, . . . . The cylindrical surface of the plurality of power sections 140, 140, . . . are in contact with each other; namely, the neighboring cathodes 110 (particularly, cathode current collector 112) are in contact with each other. Therefore, by providing the current-collecting member 113 (e.g., wiring) along the inner wall surface of the housing 160 to connect the outermost side of the cathode current collectors 112, 112, . . . , current of the cathodes 110, 110, . . . in the plurality of power sections 140, 140, . . . can be efficiently collected. On the other hand, with regard to the anode current collectors 122, 122, . . . , these are provided inside the cylinder so that the anode current collectors 122, 122, . . . are not in contact with each other. Therefore, as shown in FIG. 6, by providing the current-collecting member 123 (e.g., wiring) to connect the anode current collector 122, 122, . . . exposed on the top end of the power sections 140, 140, . . . , current of the anodes 120, 120, . . . of the plurality of power sections 140, 140, . . . can be efficiently collected.

<Zone of Excess Electrolytic Solution 103>

In the air battery module 200, the power sections 140, 140, . . . are completely immersed in the electrolytic solution 50 without being exposed in the space 61 of the below-described gas-exhausting zone 104. Therefore, above the cell-stacking zone 102, the zone of excess electrolytic solution 103 exists; whereby depletion of the electrolytic solution 50 is inhibited.

<Gas-Exhausting Zone 104>

The gas-exhausting zone 104 is a part provided at the uppermost part of the air battery module 200. Inside the gas-exhausting zone 104, the electrolytic solution 50 does not exist, but the space 61 is provided, instead. With regard to the oxygen-containing gas supplied from the gas-supplying zone 101, the remaining gas (bubble) which has not been dissolved in the electrolytic solution 50 or which has not been supplied to the cell reaction reaches the space 61 through the cell-stacking zone 102 and the zone of excess electrolytic solution 103. In the gas-exhausting zone 104, the gas exhaust port 90 extends from the space 61 to the outside of the housing 160; the remaining gas is discharged through the port. The mode of the gas exhaust port 90 may be the same as that of the air battery module 100.

In the air battery module 200, each length of the prism in the longitudinal direction (the length in the vertical direction of FIG. 2) of the gas-supplying zone 101, the cell-stacking zone 102, the zone of excess electrolytic solution 103, and the gas-exhausting zone 104 is not specifically limited. However, in view of obtaining an air battery module 200 attaining high output, it is preferable to make the length of the prism in the longitudinal direction of the cell-stacking zone 102 longer than those of other zones. More specifically, for example, the air battery module 200 can be designed such that, to the longitudinal direction of the prism of the gas-supplying zone 101, the longitudinal direction of the prism of the cell-stacking zone 102 is 20 times and the sum of the longitudinal direction of the prisms of the zone of excess electrolytic solution 103 and the gas-exhausting zone 104 is about twice.

As above, the air battery module 200 has an embodiment where the plurality of power sections 140, 140, . . . share the electrolytic solution 50 in the housing 160, which makes it possible to maintain a sufficient output and to minimize the volume of the cell-stacking zone 102. Moreover, as oxygen is dissolved in the electrolytic solution 50, the cell reaction of the power section 140 can be adequately carried out by introducing the oxygen dissolved in the electrolytic solution 50 to the cathode 110. Further, by appropriately adjusting the contact ratio (A/B) of the contact area (A) between the cathode 110 and the electrolytic solution 50 to the contact area (B) between the anode 120 and the electrolyte layer 130, it is possible to efficiently carry out the cell reaction. On the other hand, the air battery module 200 is provided with the zone of excess electrolytic solution 103 to reserve a sufficient amount of the electrolytic solution 50 in the housing 160 so that depletion of the electrolytic solution can be inhibited. Accordingly, the invention can provide an air battery module 200 which is capable of attaining downsizing and obtaining high output.

As above, there has been described an embodiment where the oxygen-containing gas is taken from the lower part of the housing and be dissolved in the electrolytic solution by bubbling and where the remaining gas (bubble) is discharged from the upper part of the housing. However, the present invention is not particularly limited as long as oxygen can be appropriately dissolved in the electrolytic solution. It should be noted that, in view of promoting homogeneous distribution of the oxygen-containing gas in the electrolytic solution and inhibiting mal-distribution of the dissolved oxygen, it is preferable to have an embodiment which supplies the oxygen-containing gas from the lower part of the housing and discharges the remaining gas (bubble) from the upper part of the housing.

In addition, the above description described an embodiment where the lamination direction of the cathode, the electrolyte layer, and the anode in the power section intersects (is orthogonal to) the vertical direction of the air battery module (as it were, an embodiment where the power sections are arranged such that the face of the cathode facing the electrolytic solution along the vertical direction); however, the invention is not specifically limited to the embodiment. It should be noted that, in view of inhibiting increase of internal resistance of the battery by letting go upwardly the gas supplied from the lower part of the housing or gas generated at a time of charge-discharge and inhibiting retention of the gas (bubble) in the battery, it is preferably to arrange the power sections along the longitudinal direction.

Further, the above description shows an embodiment where a predetermined number of power sections are arranged in the housing; however, the present invention is not limited to the embodiment. Depending on the desired performance of the battery, the number of power sections may be increased or decreased. In the invention, in view of sharing the electrolytic solution among the plurality of the power sections, two or more power sections are arranged in the housing.

While, the description of the second embodiment shows a mode where the inner and outer walls of the housing 160 are formed in a substantially hexagonal column; however, the present invention is not restricted to the embodiment. In view of arranging the power sections 140, 140, . . . in a close-packed manner and holding the power sections 140, 140, . . . compactly, a housing 160 formed in a substantially hexagonal column is preferably used.

Moreover, as shown in FIG. 6, the description of the second embodiment shows a mode where current of the cathode is collected along the inner wall of the housing 160 in a manner covering the outer edge of the power sections 140, 140, . . . of the cell-stacking zone 102 and where current of the anode is collected by connecting anode current collectors 122 being exposed at the top end of the power sections 140; however, the invention is not limited to the embodiment. In view of efficiently taking the electric energy out from the air battery module 200, the above embodiment is preferable.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that air battery module with such an alternation are included in the technical scope of the invention.

INDUSTRIAL APPLICABILITY

The air battery module of the present invention can exhibit high output and attain downsizing so that it can be suitably used not only for a power source of small devices but also a power source requiring high output, such as a power source for vehicles.

The invention claimed is:

1. An air battery module comprising: a housing; a plurality of power sections incorporated in the housing; and an electrolytic solution which is filled in the housing to immerse the plurality of power sections and in which oxygen is dissolved,
   wherein each of the plurality of power sections comprises: an anode; a cathode(s) being disposed outside of the anode and facing the electrolytic solution; and an electrolyte layer(s) being disposed between the anode and the cathode,
   wherein one of the power sections and another of the power sections sharing the electrolytic solution, and
   wherein the dissolved oxygen in the electrolytic solution is introduced into the cathode(s) of each of the power sections.

2. The air battery module according to claim 1, wherein each of the plurality of the power sections is formed in a columnar shape.

3. The air battery module according to claim 2, wherein each of the plurality of the power sections is formed in a cylindrical shape.

4. The air battery module according to claim 3, wherein a side surface of one of the cylindrical power sections and a side surface of another of the power sections are in contact with each other.

5. The air battery module according to claim 4, wherein the plurality of cylindrical power sections are arranged in a close-packed manner and incorporated in the housing.

6. The air battery module according to claim 1, wherein the ratio of a contact area A of the side surface of the cathode with the electrolytic solution to a contact area B of the side surface of the anode with the electrolyte layer (area ratio A/B) is between 1.2 and 2.2 inclusive.

7. The air battery module according to claim 1, wherein the housing comprising a gas supply port at the lower part and a gas exhaust port at the upper part, the face of the cathode which faces the electrolytic solution extends along the vertical direction of the housing.

8. The air battery module according to claim 7, wherein an oxygen-containing gas is supplied to the electrolytic solution through the gas supply port arranged at the lower part of the housing to dissolve the oxygen in the electrolytic solution.

9. The air battery module according to claim 2, wherein the ratio of a contact area A of the side surface of the cathode with the electrolytic solution to a contact area B of the side surface of the anode with the electrolyte layer (area ratio A/B) is between 1.2 and 2.2 inclusive.

10. The air battery module according to claim 3, wherein the ratio of a contact area A of the side surface of the cathode with the electrolytic solution to a contact area B of the side surface of the anode with the electrolyte layer (area ratio A/B) is between 1.2 and 2.2 inclusive.

11. The air battery module according to claim 4, wherein the ratio of a contact area A of the side surface of the cathode with the electrolytic solution to a contact area B of the side surface of the anode with the electrolyte layer (area ratio A/B) is between 1.2 and 2.2 inclusive.

12. The air battery module according to claim 5, wherein the ratio of a contact area A of the side surface of the cathode with the electrolytic solution to a contact area B of the side surface of the anode with the electrolyte layer (area ratio A/B) is between 1.2 and 2.2 inclusive.

13. The air battery module according to claim 2, wherein the housing comprising a gas supply port at the lower part and a gas exhaust port at the upper part, the face of the cathode which faces the electrolytic solution extends along the vertical direction of the housing.

14. The air battery module according to claim 3, wherein the housing comprising a gas supply port at the lower part and a gas exhaust port at the upper part, the face of the cathode which faces the electrolytic solution extends along the vertical direction of the housing.

15. The air battery module according to claim 4, wherein the housing comprising a gas supply port at the lower part and a gas exhaust port at the upper part, the face of the cathode which faces the electrolytic solution extends along the vertical direction of the housing.

16. The air battery module according to claim 5, wherein the housing comprising a gas supply port at the lower part and a gas exhaust port at the upper part, the face of the cathode which faces the electrolytic solution extends along the vertical direction of the housing.

17. The air battery module according to claim 6, wherein the housing comprising a gas supply port at the lower part and a gas exhaust port at the upper part, the face of the cathode which faces the electrolytic solution extends along the vertical direction of the housing.

\* \* \* \* \*

UNITED STATES PATENT AND TRADEMARK OFFICE
CERTIFICATE OF CORRECTION

PATENT NO.         : 8,557,475 B2                                Page 1 of 1
APPLICATION NO.    : 12/677695
DATED              : October 15, 2013
INVENTOR(S)        : S. Nakanishi It is certified that error appears in the above-identified patent and that said Letters Patent is hereby corrected as shown below:

In the Specification

In Column 6, line 49, please correct "2-emthyl" to read -- 2-methyl --.

Signed and Sealed this
Twenty-eighth Day of January, 2014

Michelle K. Lee
*Deputy Director of the United States Patent and Trademark Office*